June 2, 1925.                                        1,540,437
G. P. THOMAS
VEHICLE WHEEL
Filed March 23, 1922       2 Sheets-Sheet 2
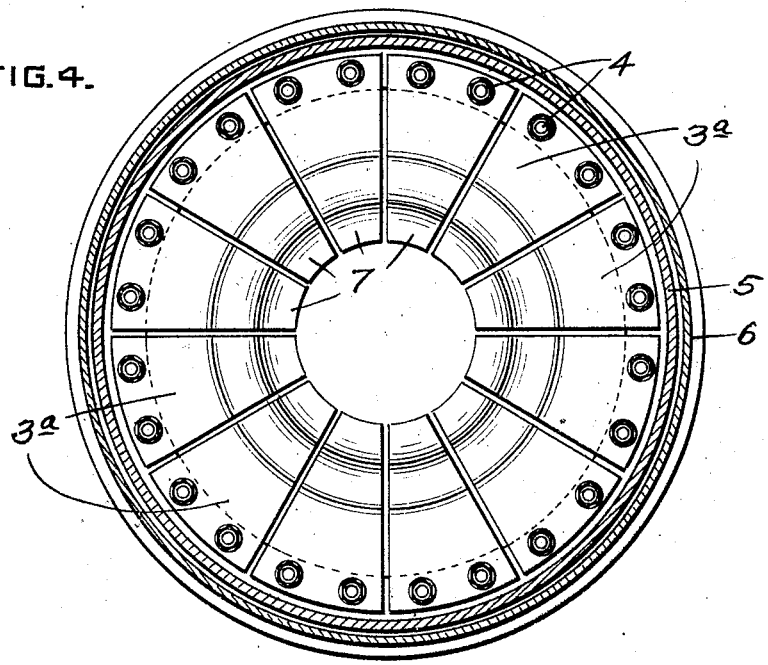
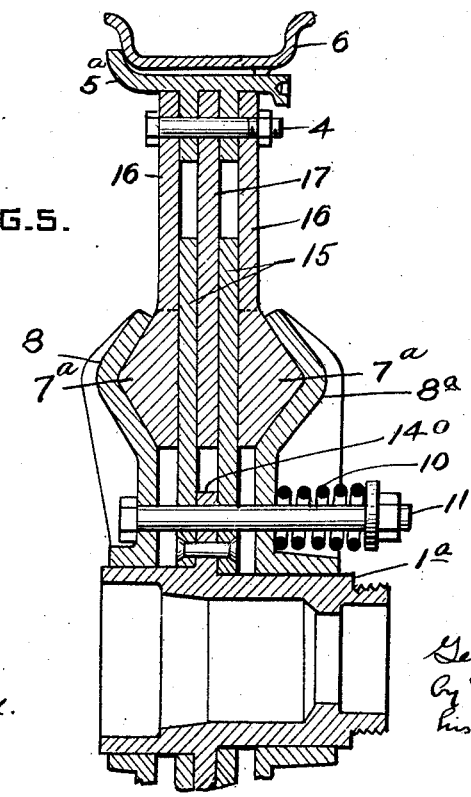

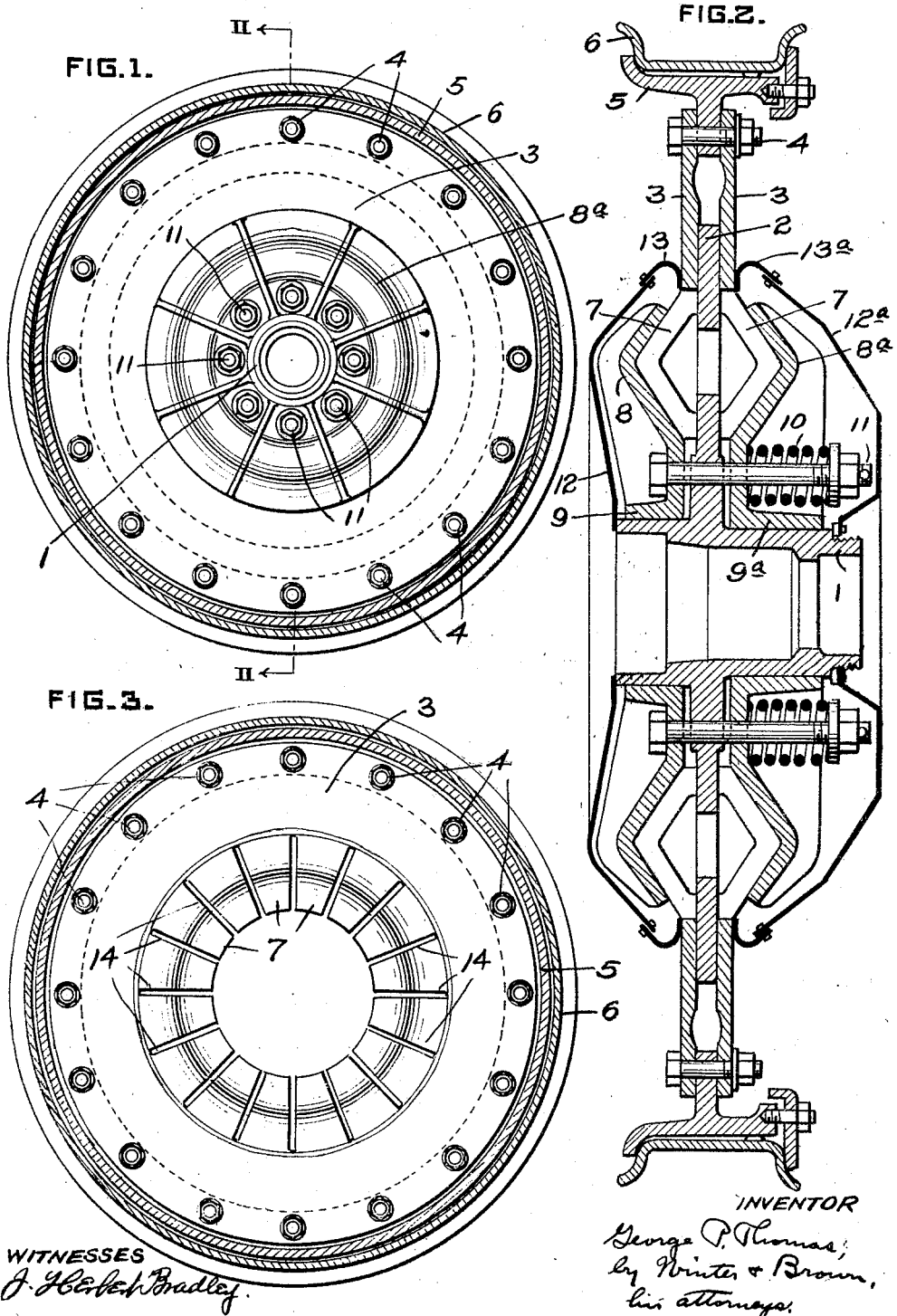

Patented June 2, 1925.

1,540,437

UNITED STATES PATENT OFFICE.

GEORGE P. THOMAS, OF GLENSHAW, PENNSYLVANIA.

VEHICLE WHEEL.

Application filed March 23, 1922. Serial No. 545,958.

*To all whom it may concern:*

Be it known that I, GEORGE P. THOMAS, a citizen of the United States, and a resident of Glenshaw, in the county of Allegheny and State of Pennsylvania, have invented a new and useful Improvement in Vehicle Wheels, of which the following is a specification.

The invention relates to vehicle wheels of the type in which the felloe is movable with relation to the hub to lessen or absorb impact shock due to irregularities in the roadway.

The object of the invention, broadly stated, is to provide a simple and practical wheel of the character described capable of effectively resisting lateral strains or thrusts and of resisting the movements of the felloe to positions eccentric to the hub.

A more specific object is to provide a wheel in which the movements of the felloe to positions eccentric to the hub are resisted by friction which is increased by such movements.

Another object is to provide a wheel in which the sole connection between the hub and felloe is a friction disk clutch capable of effectively resisting movements of the felloe to positions eccentric to the hub.

Another object is to provide a wheel of the disk type in which the disk or web between the hub and felloe is formed by the plates of a disk clutch.

The invention is illustrated in the accompanying drawings of which Fig. 1 is a side view of the wheel with the grease-retaining housing removed and the felloe and rim shown in section; Fig. 2 a central transverse sectional view of the wheel to enlarged scale, the plane of view being indicated by the line II—II, Fig. 1; Fig. 3 a side view of the felloe and parts directly connected to it, the felloe and rim being shown in section; Fig. 4 a view similar to Fig. 3 showing a modification of construction; and Fig. 5 a view similar to Fig. 2 showing a modification of construction.

In the practice of the invention the hub and felloe of a wheel are connected to each other by a friction disk clutch, one element of which is attached to the hub and the other to the felloe. The clutch elements are normally concentric with the hub and with each other, but are capable of moving with relation to each other under impact strains to positions in which the felloe is eccentric to the hub, and are also capable of moving angularly with relation to each other. Means are provided, preferably in the form of wedging members, to resist movements of the felloe to positions eccentric to the hub, such resistance being gradually increased in proportion to the eccentric movement of the felloe.

The hub and felloe of the wheel may be variously constructed for different types of axles and tires, and either of the clutch members may be attached to the hub or felloe. In the illustrative embodiment of the invention there is shown a hub 1 of a standard type adapted to be mounted upon an automobile axle. Attached to the hub and extending radially therefrom there is a disk 2 which forms one of the elements of a friction clutch for connecting the hub to the felloe. The other element of the clutch comprises a pair of annular plates 3 which frictionally bear one upon each side of disk 2. To the peripheral portions of plates 3 there is attached by means of bolts 4 a felloe 5 capable of receiving a demountable rim 6.

For urging plates 3 to their normal positions concentric with disk 2 and with the hub, the inner edges of plates 3 are preferably provided with wedge faces which may take the form of substantially V-shaped ribs 7. These ribs project outwardly, and embracing them there is a pair of collars 8 and $8^a$ provided with grooves of the same configuration as the ribs. The collars 8 and $8^a$ are provided, respectively, with flanges 9 and $9^a$ mounted for lateral or axial sliding movements upon hub 1, and are urged toward each other and into engagement with ribs 7 by means of a plurality of springs 10 acting through bolts 11 in the manner illustrated in Fig. 2.

For lubricating the sliding parts of the wheel, such parts are preferably closed within a grease-retaining housing. As illustrated in Fig. 2 such housing may comprise two parts 12 and $12^a$ rigidly attached at their inner edges to hub 1 and having yielding strips 13 and $13^a$ attached to their outer edges and bearing against the outer faces of plates 3. When the parts are assembled the housing is supplied with grease which lubricates all the sliding parts of the wheel.

As particularly illustrated in Fig. 3, ribs 7 of plates 3 may be provided with radial slots 14 which interrupt the continuity of the ribs so that they and plates 3 may be more readily pressed into frictional engagement with disk 2. If desired the slots in ribs 7 may be continued to the outer edges of the plates, thus dividing the plates into a series of segmental plates 3ª, as illustrated in Fig. 4.

In the embodiment of the invention illustrated in Fig. 5 a plurality of disks is attached to the hub and the number of plates attached to the felloe is correspondingly increased to form a multiple disk clutch. The hub 1ª is provided with a radial flange 140 to which there may be riveted or otherwise secured a pair of disks 15. Plates 16 are attached to the felloe 5ª and bear against the outer faces of disks 15, while arranged between and bearing upon the inner faces of disks 15 there is a plate 17 also attached to the felloe. Otherwise the construction is the same as that shown in Figs. 1 and 2. The disks 15 form one element and the plates or disks 16 and 17 the other element of a multiple disk clutch which functions in the manner already explained with reference to the wheel of Figs. 1 and 2. The multiple disk clutch may be used for the driving wheels of heavy trucks and in other places where the load sustained by and the power applied to the wheel is large.

In adapting the invention to a wheel for a particular purpose, the inclination of the wedge faces formed on ribs 7 and the strength and initial compression placed upon the springs 10 are so proportioned that normally the felloe will be held concentric with the hub. When an impact causes the felloe to move to a position eccentric to the hub, such movement is resisted by the friction between disk 2 and plates 3, and this friction is increased by the action of the spring-impelled collars 8 and 8ª. The greater the eccentric movement of the felloe, the greater is the resistance offered. The wedging faces formed by ribs 7 are constructed to bear upon collars 8 and 8ª throughout their entire annular extent. In other words the inner wedging faces, that is to say those adjacent to the hub, resist the impact on one side of the wheel and the outer wedging faces simultaneously resist it on the other side. In this way eccentric pressure on collars 8 and 8ª is avoided and the resistance to eccentric movements of the hub increased.

Because the plates forming the elements of the friction clutch overlap each other throughout a considerable extent of widths, the wheel effectively resists lateral strains frequently encountered by automobile wheels. In appearance and in convenience in cleaning, the wheel has all the advantages of the well known disk type of wheels, and in addition thereto is capable of absorbing impact shocks. When brakes are set on a wheel, the entire wheel will not skid with the resulting excessive wear upon the tire, but on the other hand the felloe will move angularly with relation to hub, such movement being resisted by the friction clutch.

According to the provisions of the patent statute, I have described the principle and operation of my invention together with the preferred structural embodiment thereof. However, I desire it understood that, within the scope of the appended claims, the invention may be practiced by other forms of construction than that specifically shown and described.

I claim:

1. A vehicle wheel, comprising a hub, a felloe, a friction disk clutch having one element connected to the hub and the other to the felloe and forming the sole connection between the hub and felloe, and spring-impelled wedging members urging the clutch elements to concentric position and increasing the friction between them when they are moved to eccentric positions, the elements of said clutch being capable of unlimited relative angular movement resisted by said spring-impelled members.

2. A vehicle wheel, comprising a hub, a felloe, a friction-disk clutch having one element connected to the hub and the other to the felloe and forming the sole connection between the hub and the felloe, the clutch elements being normally concentric with relation to each other and the hub, but relatively movable to eccentric positions under impact, and spring-impelled wedging members urging the clutch elements toward each other and to concentric position and increasing the friction between them when they are moved to eccentric positions, the elements of said clutch being capable of unlimited relative angular movement resisted by said spring-impelled members.

3. A vehicle wheel, comprising a hub having a radially disposed disk attached to it, a felloe, annular plates normally concentric with said hub having their peripheries attached to the felloe and frictionally engaging the sides of said disk, and spring-impelled wedging members urging said plates toward each other and to concentric position and increasing the friction between them and said disk when the plates are moved to eccentric positions, said disk and plates being capable of unlimited relative angular movement resisted by said spring-impelled members.

4. A vehicle wheel, comprising a hub having a radially-disposed disk attached to it, a felloe, annular plates normally concentric with said hub having their peripheries attached to the felloe and frictionally engaging the sides of said disk, said plates being provided with wedge faces oblique to the general plane thereof, collars having cooperating wedge faces bearing against the faces of said plates, and springs acting through said collars to urge said plates toward their normal concentric position and to press said plates into frictional engagement with said disk, said disk and plates being capable of unlimited relative angular movement resisted by said springs acting through said collars.

5. A vehicle wheel, comprising a hub having a radially-disposed disk attached to it, a felloe, annular plates normally concentric with said hub having their peripheries attached to the felloe and frictionally engaging the sides of said disk, said plates being provided on their outer faces and adjacent to their inner edges with substantially V-shaped ribs, collars having grooves to receive said ribs, and springs acting to urge said plates toward their normal concentric position and to press said plates into frictional engagement with said disk, said disk and plates being capable of unlimited relative angular movement resisted by said springs acting through said collars.

In testimony whereof, I sign my name.

GEORGE P. THOMAS.

Witness:
EDWIN O. JOHNS.